Figure 3:
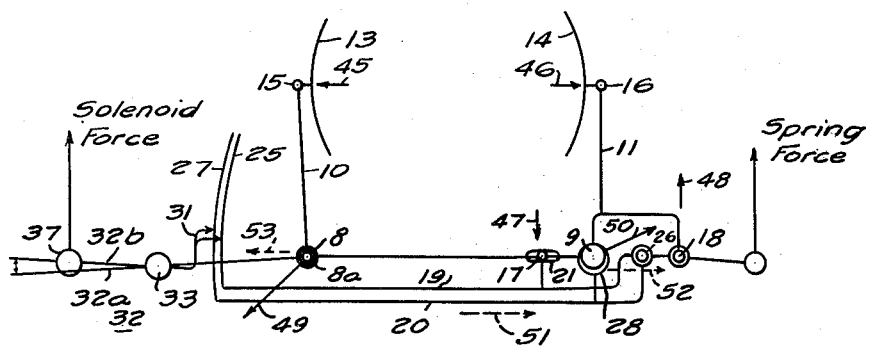

July 11, 1950  G. CURRIE  2,514,378
ADJUSTABLE TRANSVERSELY ENGAGING BRAKE
Filed Dec. 12, 1945  2 Sheets-Sheet 1
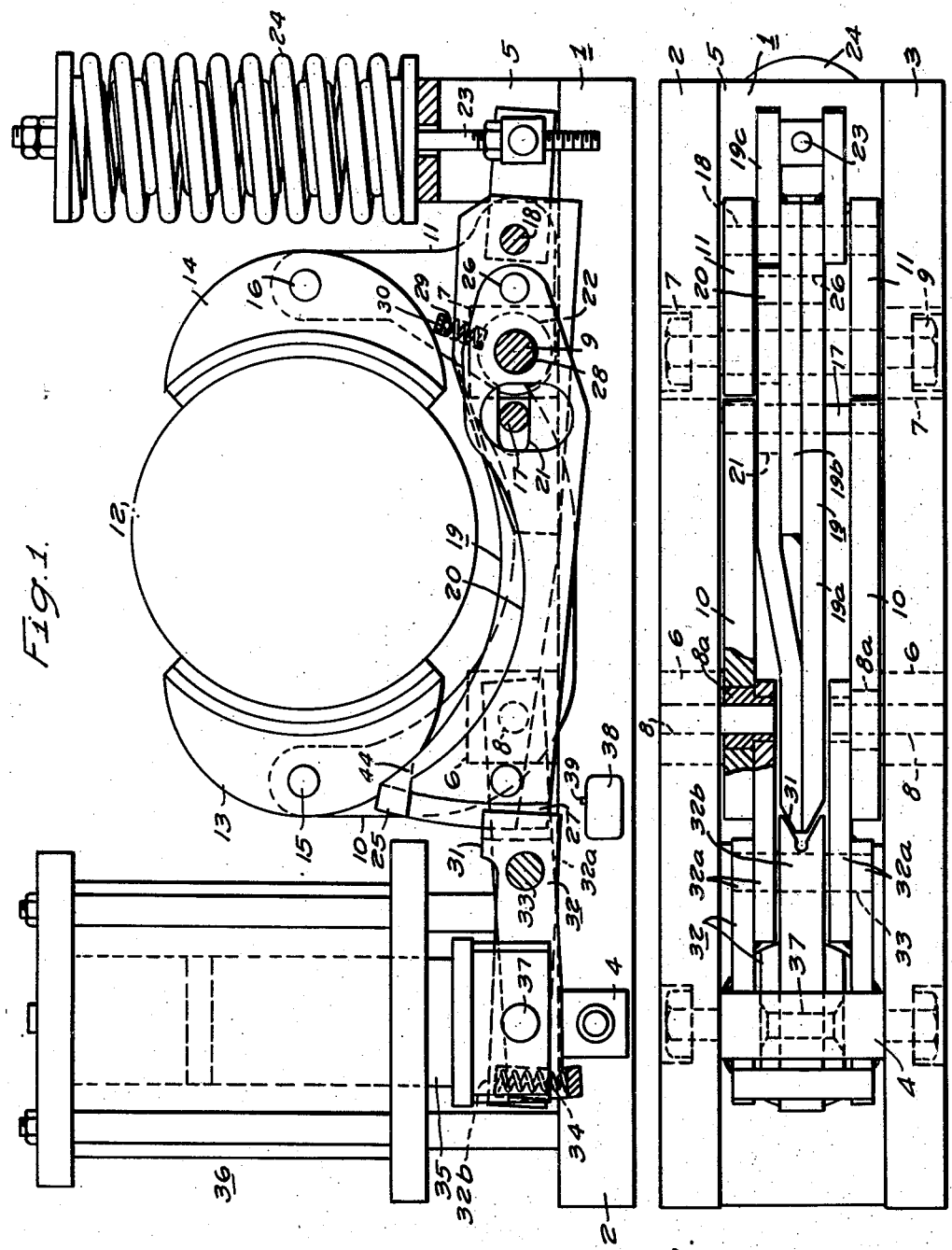
WITNESSES:
E. A. McCloskey
E. F. Oberheim
INVENTOR
Gilbert Currie.
BY
Paul E. Friedemann
ATTORNEY July 11, 1950        G. CURRIE        2,514,378
ADJUSTABLE TRANSVERSELY ENGAGING BRAKE
Filed Dec. 12, 1945        2 Sheets-Sheet 2

WITNESSES:
E. G. M'Closkey
E. F. Oberheim

INVENTOR
Gilbert Currie
BY
Paul E. Friedemann
ATTORNEY

Patented July 11, 1950

2,514,378

UNITED STATES PATENT OFFICE 2,514,378

ADJUSTABLE TRANSVERSELY ENGAGING BRAKE

Gilbert Currie, Forest Hills, Pa., assignor to Westinghouse Electric Corporation, East Pittsburgh, Pa., a corporation of Pennsylvania Application December 12, 1945, Serial No. 634,543

14 Claims. (Cl. 188—75)

This invention relates generally to brakes and is particularly directed to a brake which compensates brake wear, misalignment of parts and requires no adjustment throughout the life thereof.

This invention in preferred form of embodiment is illustrated in connection with an electric brake of the double-block type in which a spring applies the braking torque and a solenoid operating against the spring or braking torques lifts the brake shoes from the member to be braked. In the usual case, double block brakes consist of a brake wheel and have brake arms on opposite sides of the brake wheel which carry the brake shoes substantially centrally thereof. The brake is set by a compression spring and link system connecting the free extremities of the brake arms which forces the brake arms together and is usually released by means of a bell crank having its middle fulcrum on the brake arm extremity adjacent the compression spring, and one end thereof, attached to the link. Forces applied in the proper direction to the free end of the bell crank drive the free extremities of the brake arms apart and release the brake. Frequently on double block brakes the bell crank is actuated by a solenoid.

Most brakes of this general type have three adjustments, one for varying the torque and, hence, braking and releasing effort by varying the amount of spring compression, one for equalizing the shoe clearances, usually by means of separate adjustments on the shoes and the third for adjusting the stroke or travel of the solenoid plunger.

While these adjustments may vary for different types of brakes they are essentially the same. In the typical case, after the brake is mounted in position, it is necessary to make most and usually all of these adjustments, and the successful operation of the brake depends upon the skill with which the adjustments are made.

The initial adjustments, however, hold only for the initial thickness of the brake shoe lining. As the brake is used and the linings are worn, the brake is continuously moving out of adjustment. When the lining has worn an amount equal to the initial shoe clearance, the solenoid plunger travel has been doubled and it is necessary to readjust the brake to restore the travel to its original amount. If the adjustments are not made at the proper time, or not properly made, brake failures evidenced in excessive heating and burned out solenoid coils may result.

Generally, it is an object of this invention to provide a brake of the class described in which the probability of brake failure is substantially reduced.

Also it is an object of this invention to provide a brake which requires no adjustment when once put into operation.

Another object of this invention is to provide a brake of the class mentioned in which automatic compensation for brake wear is had.

Yet another object of this invention is to provide a brake in which the travel of the operating mechanism for the brake remains constant irrespective of movement of the brake shoes and arms with wear.

Still another object of this invention is to provide a brake in which automatic compensation for misalignment of the brake wheel between the brake shoes is compensated.

And still another object of this invention is to provide a brake in which wear at the point of pivoting of the brake arms is compensated and does not effect brake operation.

A further object of this invention is to provide a brake in which the forces acting on the brake arms at the points of pivoting thereof are in substantially the same direction whether the brake is on or off.

Yet a further object of this invention is to provide a brake which is efficient in operation.

A still further object of this invention is to provide a brake which is simple in its elements, consistent in its operation and economical to build.

Figure 4:
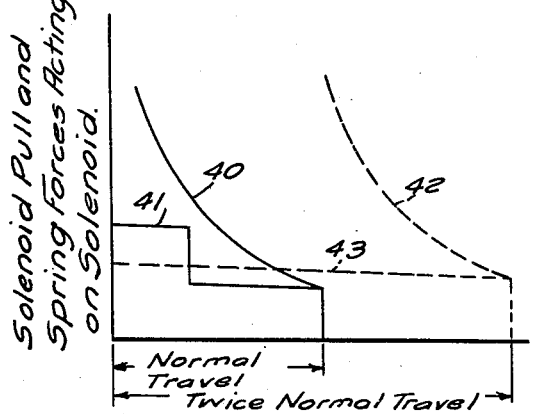

The foregoing objects are merely illustrative of the various aims and objects of this invention. Other objects and advantages will become more apparent upon a study of the following specification when considered in conjunction with the accompanying drawings, in which:

Figure 1 is a side view of an electromagnetically controlled brake, partly in section, embodying the principles of this invention, Fig. 2 is a bottom view of the brake shown in Fig. 1, Fig. 3 is a line diagram of the brake of this invention illustrating the forces acting in the brake, and Fig. 4 is a group of curves graphically comparing the operating characteristics of this invention with those of the conventional double block brake of the electrically controlled type.

The brake illustrated in the drawing is assembled upon a base 1 including the longitudinal frame members 2 and 3 which have fastened thereon blocks 6 and 7 and which are spaced by the transversely disposed members 4 and 9 and the spring support 5. Member 4 is disposed between the frame members 2 and 3 while member 9 is disposed between the blocks 7. The frame members 2 and 3 and the blocks 7 are counter bored at the points where the extremities of the members 4 and 9 pass therethrough to receive the nuts which thread onto the extremities of members 4 and 9. Blocks 6 carry fixed projecting pins 8 which are the pivots for the two members of brake arm 10. Blocks 7 provide the end supports for shoulder pin 9 about which the two members of brake arm 11 pivot. Brake wheel 12 shown in position between the brake shoes 13 and 14 is usually supported in the position shown by means of the shaft which is to be controlled by the brake. Such a shaft is normally supported in bearings (not shown) forming part of the mechanism to which it is connected. Brake shoes 13 and 14 are respectively connected to the extremities of brake arms 10 and 11 by means of pins 15 and 16, the friction forces at the points of pivoting of the brake shoes being sufficiently high to prevent the shoes from turning thereabout under their own weight and preventing shoe drag on the brake wheel when the brake is in released position. An extension of the brake arm 10 to the right of the fixed pivot 8 and beneath the brake wheel 12 terminates adjacent the fixed pivot 9 and at this extremity carries a pin 17. It is at this point that the forces for actuating the brake arm 10 are applied. Brake arm 11 also has an extension to the right of its fixed pivot 9 which carries the pin 18 and at which the actuating forces are applied. It will be noted that to apply the brake shoes to the brake wheel a force acting downwardly as viewed in Fig. 1 must be applied to pin 17 to effect clockwise rotation of brake arm 10. Conversely a force acting upwardly must be applied to the pin 18 to effect counterclockwise rotation of the brake arm 11.

Movements of the brake arms are controlled by a pair of levers 19 and 20. Lever 19 is assembled of the three lever sections 19a, 19b and 19c which may be welded or otherwise suitably joined together to form a rigid assembly. Lever 19 is pivoted about pin 18 on the brake arm 11 and slidably pivoted about the pin 17 on the brake arm 10 by means of the slot 21. In order that the fixed pin 9 about which the brake arm 11 pivots may not interfere with the movements of lever 19, a large circular opening 22 terminating in the slot 21 and surrounding fixed pin 9 is provided in the lever 19. Thus the lever 19 is supported at the points 17 and 18 respectively on the brake arms 10 and 11 at which the operating forces for the brake arms are applied. Extension 19c of lever 19 extending to the right of the points of pivoting thereof to the brake arms 10 and 11 has attached thereto the spring eyebolt 23. The force exerted by the spring assembly 24 operating in compression biases the extension 19c of lever 19 upwardly, applying an upward force to the pin 18 of brake arm 11 and applying brake shoe 14 to the brake wheel. Counterclockwise movement of lever 19 is thus effected producing a downward force to pin 17 of brake arm 10 rotating that brake arm clockwise and applying brake shoe 13 to the brake wheel. By selecting the proper lever ratios, the pressure of shoe 13 on the wheel is made equal to the pressure of shoe 14 on the wheel. While the application of the brake shoes 13 and 14 to the brake wheel have been separately described, it will be appreciated that these functions occur substantially simultaneously. Lever 19 terminates at its left end as viewed in Fig. 1 in an arcuate section 25 tapered in thickness having as its center the axis of pin 26. The arcuate section may be toothed as a gear segment, however, the provision of teeth is optional, since, a smooth arcuate surface as shown, is known from actual reduction to practice to function equally well and provides an unlimited number of contacting points. Point 26 is selected as the center of the arcuate section 25 since it is substantially the center of rotation of the lever 19 caused by angular movements of the brake arms 10 and 11 towards the brake wheel as the brake shoe linings wear. Thus the angular position of the lever 19 depends upon the degree of brake lining wear and its angular movement as wear progresses is counterclockwise substantially about the axis of pin 26.

Lever 20 is pivoted on pin 26 secured to lever 19 and also terminates in an arcuate section 27 tapered in thickness of the same radius as that of the lever 19 and also having the axis of pin 26 as its center. As seen in Fig. 2 these levers are located in side-by-side relationship with the extremities in substantial sliding engagement and tapering in thickness substantially to a point. Lever 20 is also loosely pivoted about the fixed pin 9 about which brake arm 11 is pivoted. This is accomplished by providing a hole 28 in the lever 20 having a diameter slightly greater than the diameter of pin 9. Normally gravity forces will maintain the lever 20 in the position shown in which the lost motion in the counterclockwise rotational direction of lever 20 is taken up. However, it may be desirable to positively assure this condition in which case a spring 29 disposed between the spring supporting member 30 on brake arm 11 and the lever 20, may be utilized.

The arcuate extremities of the levers 19 and 20 as seen in Fig. 2 are straddled by the pawl 31 which forms the extremity of lever 32b comprising a part of composite lever assembly 32. Pawl 31 has a V notch which engages with the correspondingly shaped arcuate surface of levers 19 and 20. This lever assembly includes the two links 32a and 32b which are pivotally joined by the pin 33. A spring 34 disposed between the links 32a and 32b at a point removed from the point of this pivotal joining at pin 33, angularly biases the links apart. Link 32a is pivoted about fixed pins 8.

This pivoting is accomplished by means of bushings 8a which pivot on the pins 8 and are each secured in the sections of the brake arm 10 (see Fig. 2). The side sections of the link 32a are each pivoted about a reduced section of the bushings 8a. The lower extremity of the plunger 35 of the solenoid 36 is pivotally fastened to the link 32b by the pin 37. The expedient of utilizing the composite levers and pivoting these levers about bushings 8a is to provide means for biasing the brake arm 10 to the left as viewed in Fig. 1 when the brake is in the off position. This will be treated more thoroughly hereinafter in the discussion of Fig. 3. As illustrated in Fig. 1, the lever assembly 32 rests upon the cross member 4 of the brake frame and the full weight of the solenoid plunger is borne thereby. Compression spring 34 is compressed under this weight and the link 32b moves angularly with respect to the link 32a. The motion is counterclockwise and by reason of the positioning of the bearing surfaces of pawl 31 with respect to the pin 33 the motion thereof is away from the tapered arcuate sections 25 and 27.

When the solenoid is deenergized the levers 19 and 20 are free to take the angular position indicated by the position of the brake wheel between the brake shoes and the angular relation of the brake arms 10 and 11 which relation depends largely upon the brake lining thickness. If the brake wheel is out of alignment either right or left of the vertical center line of the brake, the angular relation of the levers 19 and 20 changes, the pivoting thereof occurring about the axis of the pin 26 substantially at the center of rotation, but only in such a way as not to change the relationship of the pawl to the arcuate surfaces 25 and 27. That is, the spacing between the pawl and the arcuate surfaces does not measurably change. For example, if the brake wheel is to the right of the vertical center line of the brake, the pins 17 and 18 move through arcs about their fixed centers of rotation in a clockwise direction. Since pin 17 is located a greater distance from its center of rotation than pin 18, it moves the greater distance. Consequently, the angular movement of the lever 19 pivoted to pins 17 and 18 is counterclockwise. Since pins 17 and 18 have both moved downwardly with respect to pin 9, the pin 26 in some slight measure has also followed this movement. As follows, the lever 20 pivoted about pin 26 and fixed pin 9 moves angularly in a clockwise direction. The arcuate portions of the levers thus moved relatively and assume new relative positions in dependence of the degree of misalignment. This angular movement of the levers 19 and 20 is magnified at the arcuate extremities thereof and it is convenient to provide a mark, for example, the mark 44 on lever 19 which when the upper edge of the arcuate extremity of lever 20 is coincident therewith will indicate that the brake wheel is aligned with the vertical center line of the brake. It is to be understood, however, that misalignment within the limits for which the mechanism is designed does not adversely affect the operation, such misalignment being compensated by the levers 19 and 20.

As the brake lining wears the brake arm 10 pivots in a clockwise direction while the brake arm 11 pivots counterclockwise. Thus pin 17 moves down and pin 18 moves up pivoting the lever 19 about its approximate center of rotation, that is, the axis of pin 26, in a counterclockwise direction. If the center of rotation of the lever 19 is exactly at pin 26 to which lever 20 is pivoted, no translational movement of pin 26 with respect to fixed pin 9 will occur and consequently the lever 20 will not move. Should pin 26 be slightly to the right or to the left of this center of rotation of lever 19, then, of course, some slight translational motion of pin 26 with respect to pin 9 will occur and the lever 20 will angularly move either counterclockwise or clockwise depending upon the direction from true center the pin 26 is located. This, however, is not detrimental.

When the solenoid is energized, the first portion of the movement of the plunger 35 causes the link 32b to pivot and engage the pawl 31 with the arcuate extremities of links 19 and 20, the link 32a being biased against the member 4 by the action of compression spring 34. Once the pawl 31 engages the mating surfaces 25 and 27 of the levers, the links 32a and 32b move together. Levers 19 and 20 are now actuated by the movements of the pawl and operate as a single lever, being held together by the component of the pawl pressure on the angled arcuate surfaces of levers 19 and 20, and by so designing the pawl lever 32b that the resistance of levers 19 and 20 to rotation act to increase the pressure of the pawl on these levers and thus prevent slipping of the pawl on the arcuate surfaces 25 and 27.

During the first portion of clockwise rotational movement of the levers 19 and 20, pivoting thereof occurs about the pin 18 on brake arm 11 and lever 19 applies an upwardly directed force to the pin 17 which rotates the brake arm 10 counterclockwise to remove the brake shoe 13 from the brake wheel. Meanwhile the lost motion at the loose pivoting of lever 20 to the fixed pin 9 is being taken up. When the lost motion at pin 9 is completely taken up the point of pivoting of the levers 19 and 20 shifts from pin 18 to fixed pin 9 and thereafter a downwardly acting force is applied to the pin 18 causing clockwise rotational movement of the brake arm 11 to remove brake shoe 14 from the brake wheel. When brake shoe 14 is lifted from the brake wheel the solenoid plunger reaches the end of its movement. The brake is now completely released and as long as the solenoid is maintained energized, the brake shoes are held clear of the brake wheel, without the use of an equalizing stop, the force maintaining this condition being that of the spring assembly 24 acting against the solenoid pull through different leverages on each of the levers 19 and 20.

The brake of this invention also compensates bearing wear at the points of pivoting of the brake arms 10 and 11. The manner in which this is accomplished is illustrated in the diagrammatic showing of the brake in Fig. 3. Here the brake arms, levers, brake shoes and other components are indicated in single line diagram for the purpose of simplicity, and parts corresponding to those of Figs. 1 and 2 have been given like reference characters.

Wear compensation at the points of pivoting 8 and 9 of the brake arms 10 and 11 results primarily from the fact that the forces acting on the brake arms at pins 8 and 9 are in substantially the same direction whether the brake is on or off. That is, the direction of radial thrust of the brake arms at their points of pivoting 8 and 9 does not reverse from the on to the off brake position.

This will be apparent from a study of the various forces represented by the arrows in Fig. 3 which act in the on and off positions of the brake, the solid arrows representing forces acting in the on position of the brake, and the dotted arrows representing forces acting when the brake is off. No attempt has been made to scale the forces, it being felt that a qualitative analysis is sufficient to illustrate the point being made. Forces in the brake lever system resulting from brake wheel drag on the brake shoes are not considered since they would only tend to complicate the analysis. It should be noted, however, that the following analysis holds in principle whether or not these forces are considered.

Arrows 45 and 46, respectively, represent the forces acting on the brake shoes 13 and 14 as a result of the resistance to brake shoe movement offered by the brake wheel (not shown in Fig. 3). Arrows 47 and 48 represent the forces applied respectively to the pins 17 and 18 at the free extremities of the brake arms. These forces are applied by lever 19 being biased in the counterclockwise rotational direction by the spring force. The forces represented by arrows 45 and 47 resolve in the component represented by arrow 49 acting in the approximate direction indicated at pin 8, while forces 46 and 48 produce the component represented by arrow 50 acting in the approximate direction indicated at pin 9. Thus, in the brake on position the vectoral summation of forces on brake arm 10 result in a force biasing the brake arm 10 to the left against pin 8 as viewed, while the forces acting on the brake arm 11 effect a bias thereof to the right against pin 9.

When the brake is to be released or moved to the off position and the solenoid is energized, pawl 31 is thrust against the arcuate extremities of levers 19 and 20 exerting a thrust thereon which acts to the right as indicated by the dotted arrow 51. This thrust is applied to the pin 18 of the brake arm 11 and thus acts as a force biasing the brake arm 11 to the right represented by dotted arrow 52. Lever 32, by reason of its pivoted connection to lever 32b carrying pawl 31, is biased to the left as indicated by dotted arrow 53, and this bias is applied to the brake arm 10 by means of the bushing 8. Since the levers 19 and 21 are rotated in the clockwise direction by the composite lever assembly 32, the forces applied to pins 17 and 18 of the brake arms are reversed. These forces are neglected, however, since they are very small, being only sufficient to overcome brake arm friction, etc., and rotate the brake arms in a direction to lift the brake shoes from the brake wheel. The forces now acting on the respective brake arms, represented by dotted arrows 52 and 53 act substantially in a horizontal direction at pins 8 and 9, and bias the brake arms in substantially the same direction as the forces 49 and 50. Thus, any lost motion in the pivoting of brake arms 10 and 11 at points 8 and 9 does not effect brake operation, since the brake arm bias at their points of pivoting is always in the same direction. Any wear which may occur at these bearing points resulting in a change in angular disposition of the brake arms is compensated by a change in angular relation of the levers 19 and 20 much the same as compensation is afforded for brake lining wear as previously described.

It is thus apparent that need for adjusting the travel of the solenoid plunger is eliminated since the plunger travel remains constant. All the variable factors resulting from brake wear and misalignment being compensated in changes in angular relation of the levers 19 and 20 and in changes of the points of engagement of the pawl 31 with the arcuate extremities of the levers.

In order to eliminate all adjustments, it is only necessary to provide a spring or assembly of springs 24, as shown, with a small enough scale so that the difference in shoe pressure between the condition of new brake lining and that of old or worn brake lining, does not vary more than 10%, in which case, the brake can be set for 110% of rated braking torque at the time of assembly and the braking torque will not drop below 100% of the brake's rating when the linings have worn to the point where they should be replaced.

There are numerous other advantages inherent in the brake of this invention besides the elimination of need for brake adjustments. One of these advantages is had in the provision of a switch 38, for example, a snap acting switch of conventional type, in such a position that the switch actuating member 39 will be engaged by the lever 19 when the brake lining has worn to a permissible limit. The switch 38 in any well known manner may control a light, a bell or other warning device, thus indicating that the brake linings should be renewed.

Another advantage resides in the fact that the angular relation of the levers serves as an indication that the brake wheel is properly aligned with the brake shoes thus eliminating the chances of misalignment.

Still another advantage results from the constant stroke of the solenoid plunger. As a consequence of this constant plunger stroke, the solenoid does not have to develop an excessive pull, as in the conventional type wherein the plunger stroke increases as the brake linings wear. Thus destructive hammer blows of the solenoid are measurably reduced.

A further reduction in hammer blows results from the change in leverage as the levers are actuated by the solenoid and the solenoid does its work of compressing the brake spring 24. It will be remembered that the levers first pivot about pin 18 and when the lost motion in the pivoting of lever 20 at pin 9 is taken up the pivot shifts to pin 9. In the first instance, when the solenoid air gap is maximum and consequently its pull least, the mechanical advantage at the solenoid is greater. As the air gap decreases and the solenoid pull rises the leverage pivot shifts and decreases the mechanical advantage. This tends to more nearly match the available effort at the solenoid with the opposing mechanical forces.

The advantage of this is seen from the curves of Fig. 4 in which the solid curves 40 and 41 respectively designate the pull curve of the solenoid and the work to be done in the brake of this invention and the dotted curves 42 and 43 respectively designate the pull curve of a solenoid and the work to be done in a conventional double-block brake as described in the preamble to this specification.

It will be seen that the pull curve for the conventional solenoid brake has considerably more area than that required by the brake of this invention, and, since, when both types of brakes are properly adjusted, the work to be done is the same, assuming equally rated brakes, the excess force in the conventional brake is absorbed in destructive hammer blows of the solenoid plunger.

With all brake designs the solenoid should pull in at a definite voltage or current. For example, the solenoids on alternating current brakes should pull in at about 85% of full voltage, the solenoids of direct current shunt brakes should pull in at 80% of full voltage and the solenoids of direct current series brakes should pull in at 40% of full voltage. If the solenoid stroke varies, it is not possible to adjust the brake so that the above solenoid response is possible. With the brake of the present invention, this desirable operating characteristic is obtainable.

In alternating current brakes, the impedance of the solenoid coil varies inversely of the air gap between the solenoid plunger and core. Thus a relatively low impedance of the coil exists when the magnetic circuit air gap is large. If the plunger fails to pull in, the coil currents are excessive and frequently result in burned out coils. The present invention by providing constant solenoid plunger travel and the change in leverage as the levers are actuated by the solenoid eliminates this trouble.

It is, of course, apparent that other arrangements of lever means may be utilized to effect the various desirable operating characteristics of the brake of this invention without departing from the spirit and scope hereof, which is namely that of the provision of a lever means so constructed and arranged in pivotal relation with the brake arms and with an actuating means that compensation for brake variables is obtained and a constant travel or stroke of the actuating means for operating the brake is provided.

The foregoing disclosure and the showings made in the drawing are merely illustrative of the principles of this invention and are not to be interpreted in a limiting sense. The only limitations are to be determined from the scope of the appended claims.

I claim as my invention:

1. A brake comprising, in combination, a movable member to be braked, a pair of brake shoes, a pair of brake arms mounted on pivots and one attached to each brake shoe for effecting movement of said brake shoes to and from positions engaging said brake drum about the pivots of the respective brake arms, a first lever pivotally secured to both of said brake arms at points on each removed from the pivots of the respective brake arms, so that leverage for actuation of the brake arms is obtained, said first lever having a substantially fixed center of rotation defined by the arcuate movements of the points on said brake arms at which said first lever is pivoted, means for biasing said first lever in a direction to cause said brake arms to press said brake shoes against the brake drum, said first lever including an arcuate surface having as its center substantially the center of rotation of said first lever, a second lever mounted on a pivot on said first lever substantially at the center of rotation of the first lever and loosely pivoted to one of said brake arms substantially at the point of pivoting of said one brake arm, said second lever having an arcuate surface substantially of the same radius as the arcuate surface of said first lever, and means engageable with said arcuate surfaces for actuating said levers.

2. A brake comprising in combination, a member to be braked, a pair of brake shoes, a pair of brake arms mounted on pivots and one attached to each brake shoe for effecting movement of the brake shoes about the pivots of the respective brake arms, to and from positions engaging said member, a first lever pivotally secured to both of said brake arms at a point on each removed from the pivots of the respective brake arms so that leverage for actuation of the respective brake arms is obtained, means for biasing said first lever in a direction to cause said brake arms to press said brake shoes against said member, a second lever mounted on a pivot on said first lever between the points at which said first lever is pivoted to said brake arms said second lever also being pivoted substantially at the point of pivoting of one of said brake arms, and means for simultaneously actuating said levers.

3. A brake comprising in combination, a member to be braked, a pair of brake shoes, a pair of brake arms mounted on pivots and one attached to each brake shoe for effecting movement of the brake shoes about the pivots of the respective brake arms, to and from positions engaging said member, a first lever pivotally secured to both of said brake arms at a point on each removed from the pivots of the respective brake arms so that leverage for actuation of the respective brake arms is obtained, means for biasing said first lever in a direction to cause said brake arms to press said brake shoes against said member, a second lever mounted on a pivot on said first lever between the points at which said first lever is pivoted to said brake arms said second lever also being loosely pivoted substantially at the point of pivoting of one of said brake arms, to provide a predetermined limited lateral movement of said second lever at its point of loose pivoting before angular movement thereof about the point of loose pivoting occurs, and means for simultaneously actuating said levers.

4. A brake comprising, in combination, a movable member to be braked, a pair of brake shoes, a pair of pivotally mounted brake arms, one for each brake shoe, for actuating the brake shoes, a pair of levers, one of said levers being pivotally connected to both of said brake arms, the other of said levers being pivotally connected to said one lever at a point which is substantially the center of rotation of said one lever and also pivotally connected to one of said brake arms substantially at the point of pivoting thereof, means for biasing said one lever in one direction and means for actuating both said levers in the opposite direction.

5. A brake comprising, in combination, a movable member to be braked, a pair of brake shoes adapted for frictional engagement with said member, a pair of pivotally mounted brake arms, one for each brake shoe, for actuating the brake shoes to engage and disengage said member, a pair of levers, one of said levers being pivotally connected to both of said brake arms, the other of said levers being pivotally connected to said one lever between the points of pivoting of said one lever to said brake arms and also loosely pivoted to one of said brake arms to provide limited lateral movement thereof with respect to the point of pivoting, means for biasing said other lever in one direction laterally to take up the lost motion at the point of loose pivoting thereof, means for biasing said one lever in a direction to actuate said brake arms to apply said brake shoes to said member, and means for biasing both of said levers in a direction to actuate said brake arms to remove said brake shoes from said member.

6. A brake comprising in combination, a member to be braked, a pair of brake shoes, a pair of brake arms mounted on pivots and one attached to each brake shoe for effecting movement of the brake shoes about the pivots of the respective brake arms, to and from positions engaging said member, a first lever pivotally secured to both of said brake arms at a point on each removed from the pivots of the respective brake arms so that leverage for actuation of the respective brake arms is obtained, means for biasing said first lever in a direction to cause said brake arms to press said brake shoes against said member, a second lever mounted on a pivot on said first lever between the points at which said first lever is pivoted to said brake arms said second lever also being pivoted substantially at the point of pivoting of one of said brake arms, each of said levers having arcuate surfaces the centers of which are substantially at the point of pivoting of the second lever to the first lever, a link pivotally mounted substantially at the point of pivoting of said one brake arm, a second link pivotally attached to said first mentioned link and having a pawl thereon constructed and arranged to engage said arcuate surfaces of said levers, a resilient member biasing said links to a predetermined angular relationship, and means for actuating said second link.

7. A brake comprising in combination, a member to be braked, a pair of brake shoes, a pair of brake arms mounted on pivots and one attached to each brake shoe for effecting movement of the brake shoes about the pivots of the respective brake arms, to and from positions engaging said member, a first lever pivotally secured to both of said brake arms at a point on each removed from the pivots of the respective brake arms so that leverage for actuation of the respective brake arms is obtained, means for biasing said first lever in a direction to cause said brake arms to press said brake shoes against said member, a second lever mounted on a pivot on said first lever between the points at which said first lever is pivoted to said brake arms said second lever also being pivoted substantially at the point of one of said brake arms, each of said levers having arcuate surfaces the centers of which are substantially at the point of pivoting of the second lever to the first lever, a link pivotally mounted substantially at the point of pivoting of said one brake arm, a second link pivotally attached to said first mentioned link and having a pawl thereon constructed and arranged to engage said arcuate surfaces of said levers, and means for actuating said second link.

8. An electromagnetic brake comprising, in combination, a member to be braked, at least two brake shoes adapted for engagement with said member, a pair of pivotally mounted brake arms, said brake shoes being attached to said brake arms, a first lever pivotally mounted to both of said brake arms at points on the brake arms removed from the points of pivoting thereof, means including a resilient member for biasing said first lever in a direction to move said brake arms to apply said brake shoes against said member, a second lever pivotally attached to said first lever at a point between the points of pivoting of said first lever on said brake arms and pivotally attached to one of said brake arms substantially at the point of pivoting thereof, an electric solenoid, and means attached to said solenoid for actuation thereby, constructed and arranged to engage both of said first and second levers.

9. A brake comprising, in combination, a member to be braked, at least two brake shoes adapted for engagement with said member, a pair of pivotally mounted brake arms, said brake shoes being attached to said brake arms, a pair of levers, means for securing said levers to said brake arms and to each other constructed and arranged to effect angular movement of said levers in different amounts in dependence of changes in angular position of said brake arms resulting from brake wear, means for applying a bias to at least one of said levers to cause application of said brake shoes against said brake drum, and means for simultaneously moving both of said levers in a direction opposite to that affected by said biasing means while maintaining the angular relation of the levers.

10. An electromagnetic brake comprising, in combination, a rotatable brake drum, a pair of brake shoes, a pair of pivotally mounted brake arms, said brake shoes being attached to said brake arms at points removed from the points of pivoting thereof, said brake arms being disposed on opposite sides of said brake drum to effect movement of said brake shoe to and from positions engaging said brake drum on opposite sides of said brake drum, each of said brake arms having extension arms terminating at points removed from the points of pivoting thereof, the extension arm of one of said brake arms extending substantially to the point of pivoting of the other of said brake arms, a first lever pivotally attached to both of said extension arms of said brake arms adjacent the extremities thereof, a second lever pivotally attached to said first lever at a point between the pivotal attachement thereof to said extension arms and also loosely pivoted about the point of pivoting of said other brake arm to provide limited lateral movement of the second brake arm with respect to said point of pivoting of said other brake arm, means including a resilient member for biasing said first lever and the brake arms in a direction to effect application of said brake shoes against said brake drum, an electric solenoid, a pawl and lever assembly constructed and arranged so that said pawl simultaneosly engages said first and second levers to actuate said first and second levers oppositely to the actuation of the levers by said means including the resilient member, and means connecting said pawl lever assembly to said solenoid to be actuated thereby.

11. A brake comprising, in combination, a member to be braked, at least two brake shoes, a pair of pivotally mounted brake arms, said brake shoes being attached to said brake arms, said brake arms upon movement thereof moving said brake shoes to and from positions engaging said member, lever means, a fixed pin, a pin on each of said brake arms at a point removed from the point of pivoting thereof, said fixed pin being disposed between said pins on said brake arms, said lever means being pivotally mounted on the pin on one of said brake arms, loosely pivoted about the fixed pin to provide limited lateral movement thereof with respect to the fixed pin and slidably pivoted about the pin on the other of said brake arms, and means for actuating said lever means.

12. A brake, comprising, in combination, a movable member to be braked, at least two brake shoes having surfaces thereon of a configuration to fit said member, first and second brake arms one attached to each brake shoe, first and second pivot means for pivotally mounting said brake arms so that angular movement of said brake arms is had to move said brake shoes to and from positions engaging said member, a first lever pivotally attached to both of said brake arms at a point on each removed from each of said pivot means, a second lever pivotally attached to said first lever at a point between the point of pivoting of said first lever to said first brake arm and said first pivot means, and also loosely pivoted about said first pivot means, means for angularly moving said first and second levers in one direction, and means for angularly moving said first and second levers in the opposite direction.

13. A brake comprising, in combination, a member to be braked, friction means for frictionally engaging said member to be braked, actuating means for moving said friction means to and from positions engaging said member to be braked, lever means attached to said actuating means constructed and arranged to change its position in dependence of movements of said actuating means resulting from brake wear and misalignment, means for biasing said lever means in a direction to effect movement of said actuating means to apply said friction means to said member to be braked, a movable operating member, a portion of said lever means being disposed in proximity to said movable operating member and formed so that upon movement of said lever means as a result of break wear and misalignment said portion may move relative to said operating member without changing the proximity relation thereto, said movable operating member being movable to and from positions to engage said portion of said lever means to effect movement thereof oppositely to said one direction to reverse the movement of said actuating means.

14. In a brake for a member to be braked, the combination of, friction means for engaging said member, movable actuating means connected with said friction means to effect operation thereof to and from positions engaging said member, lever means, pivot means mounting said lever means for angular movement, means providing engagement of said lever means with said actuating means at a point removed from said pivot means, said lever means having a surface thereof of a configuration so that the distance of all points thereof from a fixed point is substantially constant irrespective of angular movements of said lever means within its limits, a lever operator pivotally mounted at a point adjacent said pivot means, a pawl pivotally mounted on said lever operator and having a part spaced a predetermined distance from said surface, said pawl being normally disengaged from said lever means and being operable through said distance to engage said surface of said lever means for effecting operation thereof.

GILBERT CURRIE.

REFERENCES CITED

The following references are of record in the file of this patent:

UNITED STATES PATENTS

| Number | Name | Date |
|---|---|---|
| 2,078,629 | De Lorme | Apr. 27, 1937 |
| 2,107,894 | Hymans | Feb. 8, 1938 |
| 2,270,417 | Cox | Jan. 20, 1942 |